(12) United States Patent
Kim

(10) Patent No.: US 6,968,182 B1
(45) Date of Patent: Nov. 22, 2005

(54) METHOD FOR ESTABLISHING A CALL CONNECTION THROUGH A CALL FORWARDING SERVICE IN TELECOMMUNICATION NETWORK

(75) Inventor: Roe-Kwan Kim, Yongin-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 885 days.

(21) Appl. No.: 09/709,068

(22) Filed: Nov. 9, 2000

(30) Foreign Application Priority Data

Nov. 11, 1999 (KR) .......................................... 1999-49874

(51) Int. Cl.[7] .............................. H04M 3/42; H04Q 7/20
(52) U.S. Cl. ...................... 455/418; 455/417; 455/445; 455/414.1; 379/88.04; 379/201.01
(58) Field of Search .................. 455/417, 461, 455/462, 418, 445, 412.2, 414.1, 405, 459, 455; 379/211.02, 201.12, 201.01, 88.04, 88.12, 88.01, 201, 81, 88.22, 201.07, 201.08, 211.01, 210.02, 212.02

(56) References Cited

U.S. PATENT DOCUMENTS

| | | | | |
|---|---|---|---|---|
| 5,027,384 A | | 6/1991 | Morganstein | 379/67 |
| 5,583,564 A | * | 12/1996 | Rao et al. | 379/211.02 |
| 5,592,541 A | | 1/1997 | Fleischer, III et al. | 379/211 |
| 5,615,253 A | * | 3/1997 | Kocan et al. | 379/211.02 |
| 5,924,016 A | | 7/1999 | Fuller et al. | 455/31.1 |
| 6,122,502 A | * | 9/2000 | Grundvig et al. | 455/414.1 |
| 6,208,854 B1 | * | 3/2001 | Roberts et al. | 455/417 |
| 6,397,055 B1 | * | 5/2002 | McHenry et al. | 455/445 |
| 6,397,058 B1 | * | 5/2002 | Thibert et al. | 455/445 |
| 6,463,145 B1 | * | 10/2002 | O'Neal et al. | 379/211.02 |
| 6,526,137 B1 | * | 2/2003 | Copley | 379/221.03 |
| 6,535,596 B1 | * | 3/2003 | Frey et al. | 379/201.01 |
| 6,674,746 B1 | * | 1/2004 | Lamarque, III | 370/352 |

* cited by examiner

Primary Examiner—David Hudspeth
Assistant Examiner—Kamran Afshar
(74) Attorney, Agent, or Firm—Cha & Reiter, L.L.C.

(57) ABSTRACT

A method for processing a call in call forwarding on telecommunication network is disclosed. The method comprises the steps of checking whether or not a call is to be forwarded when the calling subscriber originates a call, determining whether the call forwarding connection is pre-approved, and selectively establishing the call connection.

14 Claims, 5 Drawing Sheets

200

METHOD FOR ESTABLISHING A CALL CONNECTION THROUGH A CALL FORWARDING SERVICE IN TELECOMMUNICATION NETWORK

CLAIM OF PRIORITY

This application makes reference to and claims all benefits accruing under 35 U.S.C. Section 119 from an application for "Method for Connecting using a Call Forwarding in Telecommunication Network" filed with the Korean Industrial Property Office on Nov. 11, 1999 and there duly assigned Serial No. 99-49874.

BACKGROUND OF THE INVENTION

1. Field of the Invention

The present invention relates generally to a call forwarding service in a wireless or a wire telecommunication system. More particularly, the present invention relates to a method for making a call connection using the call forwarding service, considering not only the subscriber who has requested a call forwarding service at a particular number but also the subscriber who is originating a call to the call-forwarded number as well as the subscriber who is receiving a call through the call-forwarded number.

2. Description of the Related Art

Generally, call forwarding feature includes a series of operation performed so that when a subscriber can receive an incoming call to his/her designated telephone number. For example, if a subscriber B requests a call forwarding service to route the incoming call to his/her own telephone number to another telephone number C, the subscriber A's call request to the B's telephone number will be forwarded to the C's telephone number. This call forwarding feature is quite useful if the subscriber B will be absent for a long time on a business trip and wishes to receive any call directed to himself/herself through C's telephone in the business trip location. Such a call forwarding method is designed for the convenience of the subscriber B alone; however, the subscriber A who called B at B's telephone number now has to pay for a connection fee for the call being forwarded to C's telephone number. In particular, when the forwarded C's telephone number is a long distance call or an international call, the subscriber A will be burden with paying the higher connection fee. Moreover, in some telecommunication system, a connection charge fee is applied not only to the caller but also to the receiving party; thus, the subscriber C is also forced to pay the higher connection fee in some instances.

As described above, the conventional call forwarding service is only centered around for the convenience of the subscriber B at the expense of the calling party A and the receiving party B.

SUMMARY OF THE INVENTION

It is, therefore, an object of the present invention to provide a method for selectively making a call connection at the discretion of the caller who is calling the number that has been forwarded to another telephone number.

It is another object of the present invention to provide a method for selectively making a call connection at the discretion of the receiving party who is receiving the forwarded call to the forwarded number.

It is still another object of the present invention to provide a method for making a call connection by considering the subscriber who is calling a number that has been forwarded to another telephone number as well as the subscriber who is receiving the forwarded call in the conventional wireless telecommunication system.

To achieve the above objects, there is provided a method for processing a call connection with respect to the destination switch in a telecommunication network, comprising the steps of checking whether the call is to be switched at the destination upon request for the call connection from a calling subscriber, reading out data approving the call forwarding, which is pre-set by the calling subscriber and the receiving subscriber if the call is to be switched at destination, and connecting or interrupting the call according to the data indicating approval of the call forwarding, which is pre-set by the calling subscriber and the receiving subscriber.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
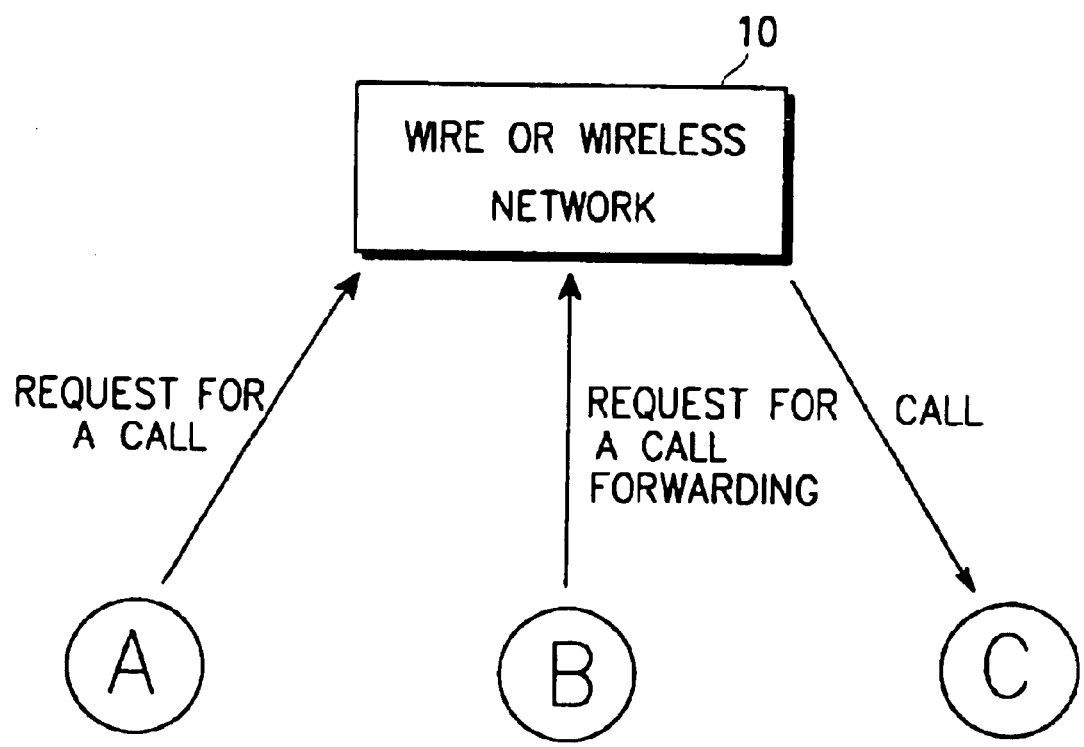
FIG. 1 is a schematic view illustrating the call forwarding process by several subscribers according to an embodiment of the present invention.

FIG. 1 is a schematic view illustrating the call forwarding process made by a predetermined of subscribers according to an embodiment of the present invention.

Referring to FIG. 1, a subscriber B receives an incoming call to his/her own telephone number and has set the call forwarding feature to forward the incoming call to the subscriber C's telephone number. To be specific, the subscriber A's call to the subscriber B's telephone number is transferred to the subscriber C's telephone number when the call forwarding service feature is activated by the subscriber B in the wire/wireless network 10.

Figure 2:
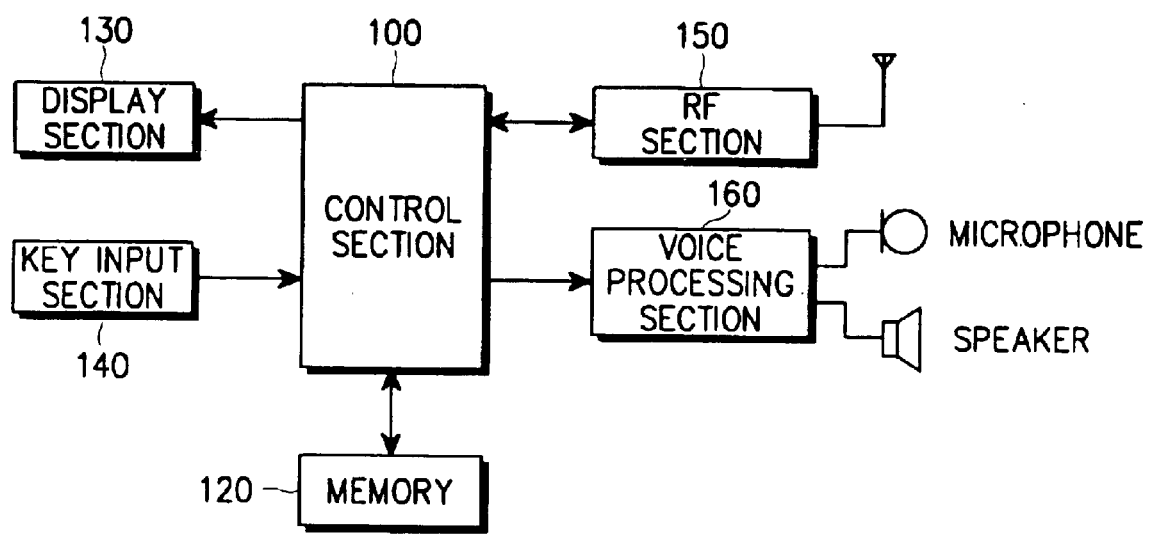
FIG. 2 is a block diagram illustrating the wireless terminal according to an embodiment of the present invention.
Figure 3:
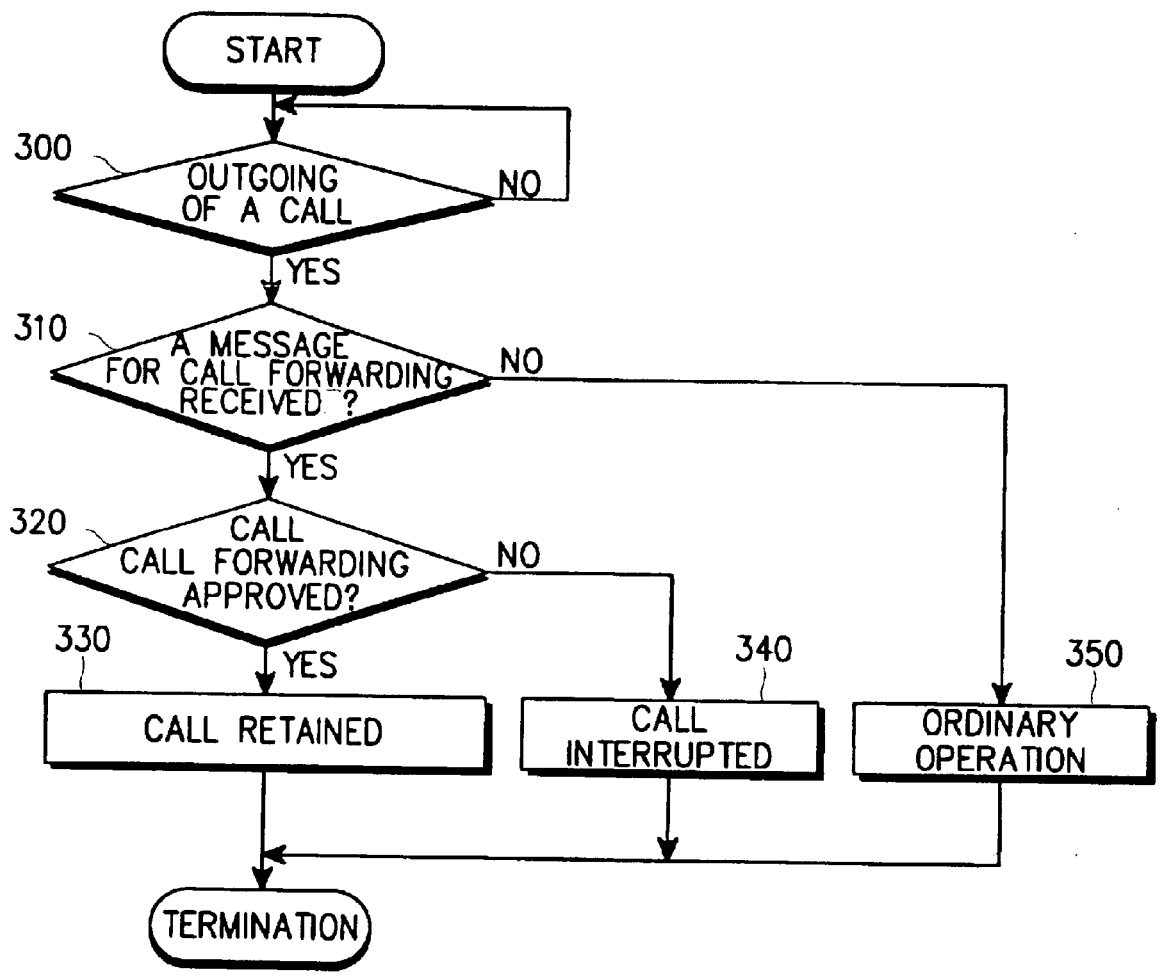
FIG. 3 is a flow chart illustrating a control process for making a call connection to the call forwarded number from the caller's telephone according to an embodiment of the present invention.

FIG. 2 is a simplified block diagram illustrating a wireless terminal according to the embodiment of the present invention. Referring to FIG. 2, a control section 100 controls overall operation of the wireless terminal. A key input section 140 comprises a plurality of number keys, alphabet keys, function keys FCN, a storage key STO, volume down/up keys, and navigation keys (vertical and horizontal)

for generating key data with respect to those keys. A memory 120 temporarily stores data generated in the course of performing a predetermined operation program. A display section 130 displays various information which includes the data display, operating status, etc. as inputted from the key input section 140. An RF section 150 performs the modulation and the demodulation by amplifying and filtering signals transmitted and received via the antenna (ANT), respectively. A voice processing section 160 controlled by the control section 100 digitizes the voice inputted to a microphone, demodulates voice data received via the RF section 150, and outputs the demodulated voice data to speakers.

A description will now be made of a method for making a call connection to the call forwarded telephone number according to the embodiment of the present invention. First, the user will dictate whether or not to allow an outgoing call to be established if the outgoing call is being forwarded to another telephone number. The following is a description as to how to establish a call connection in such a case.

In step 300, the control section 100 determines if there is an outgoing call being originated by the caller A. If the determination is affirmative, the control section 100 attempts a call connection to the B's telephone number via a base station (not illustrated in the drawings) according to a normal procedure, and the call is connected to the B's telephone number. Here, any call directed to the B's telephone number is being forwarded to another number. At this time, a message is announced to the terminal A that the outgoing call origination to B is to be forwarded to another number. This message sent to the terminal A is transferred through a facility message, which indicates the status of the requested call connection transmitted to the terminal A via the base station. In step 310, the control section 100 of the terminal A receives the message indicating that call is being forwarded to another number and proceeds to step 320. If no such a message is received in the step 310, step 350 is performed to connect or interrupt the speech path according to the normal call connecting procedure.

In step 320, the control section 100 of the terminal A retrieves data as to determine whether or not to allow call connection to a pre-set speech path that is designated through the call forwarding service. Thus, the call forwarding service is selectively established/maintained or terminated/interrupted. If the read-out data indicates an approval of accepting the call forwarding connection, then step 330 is performed to maintain the speech path. Otherwise, step 340 is proceeded to interrupt the call connection. In other words, the forwarded call is either maintained or interrupted according to the value pre-set by the caller. The control section 100 of the terminal A may automatically interrupt the call connection if the read-out data indicates to refuse any call forwarding connection. As an alternative, the control section 100 of the terminal A may send a specific buzzer sound or voice message so that the user can selectively establish the call forwarding connection. If the user decides not to benefit the call forwarding connection, the user can hang up the telephone or activate the termination key (or by closing the flip cover).

The following is a description of a method for establishing a call connection when a receiver terminal receives the forwarded call according to an embodiment of the present invention.

Figure 4:
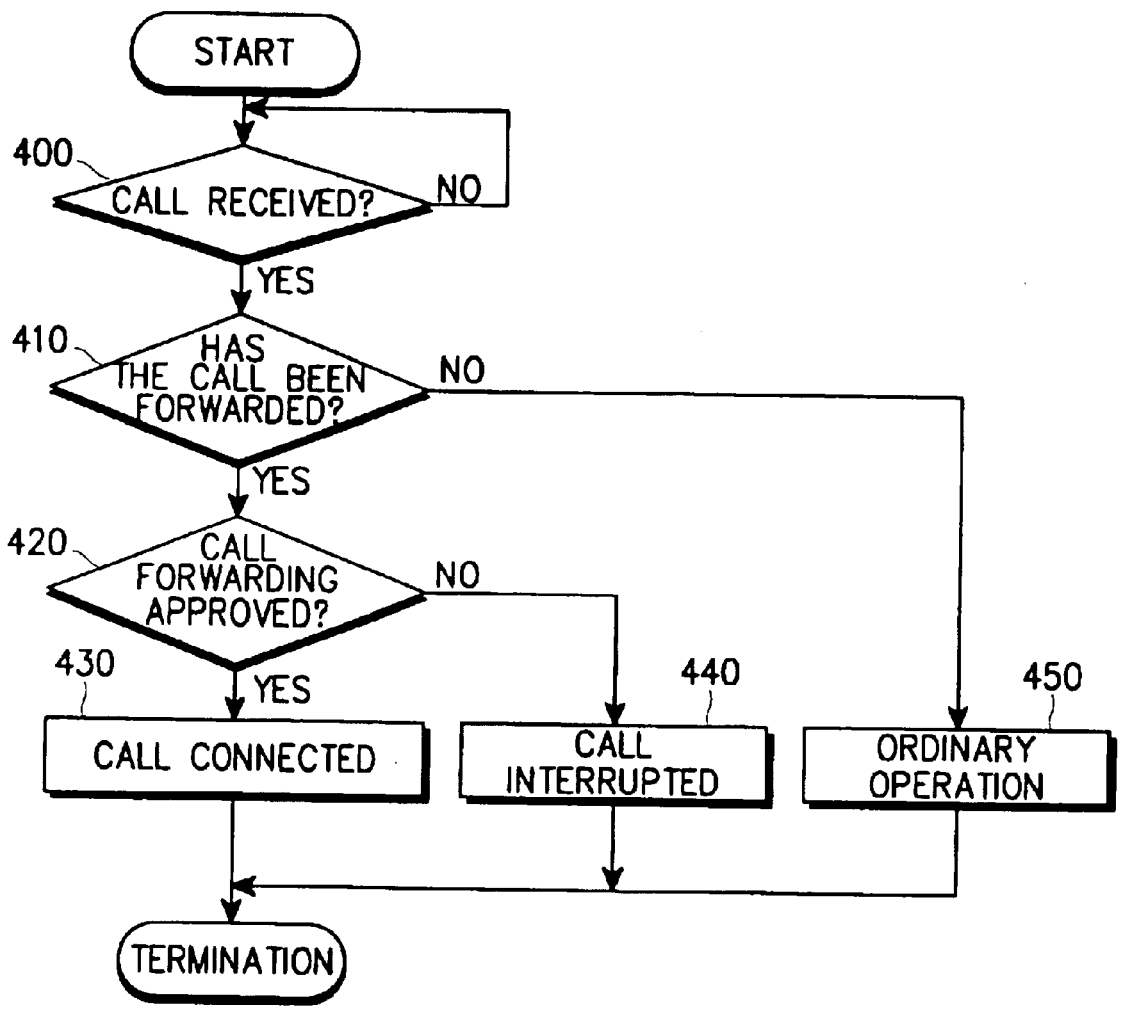
FIG. 4 is a flow chart illustrating a control process for making a call connection to the call forwarded number by the receiver's telephone according to an embodiment of the present invention; and, FIG. 5 is a flow chart illustrating a control process for making a call connection to the to-be-forwarded telephone number in a network according to an embodiment of the present invention.

The following is a description of a method for establishing a call connection to a speech path after the receipt of an incoming call at the receiver terminal. With reference to FIGS. 2 and 4, the user first designates whether or not to allow an incoming call that has been forwarded to the user through a call forwarding service.

If a signal is received at the receiver terminal in step 400, step 410 is performed to determine whether or not the incoming call is a forwarded call. If the determination is affirmative, step 420 is performed, and if negative, step 450 is performed to connect or interrupt the speech path in an ordinary known method.

In step 420, the control section 100 reads out data indicating whether or not the receiver terminal is activated to receive the incoming forwarded call in such way that the receiver terminal can either maintain the call connection or interrupt the call forwarding process. If the read-out data indicates an approval of receiving the forwarded call, step 430 is performed to connect the speech path for the call connection. Otherwise, step 440 is executed to interrupt the call. To state otherwise, if the forwarded call is received by the receiver, the speech path is either connected or interrupted based on the pre-set value, which indicates to accept the forwarded call or not. Here, the control section 100 of the terminal may automatically interrupt the call if the read-out data indicates to refuse any incoming calls received through the call forwarding service. As an alternative, the control section 100 may send a particular buzzer sound or display a particular message at the display section so that the user can be notified of such an incoming call. Then, the user can selectively make a decision to either accept the incoming forwarded call at his or her discretion.

Figure 5:
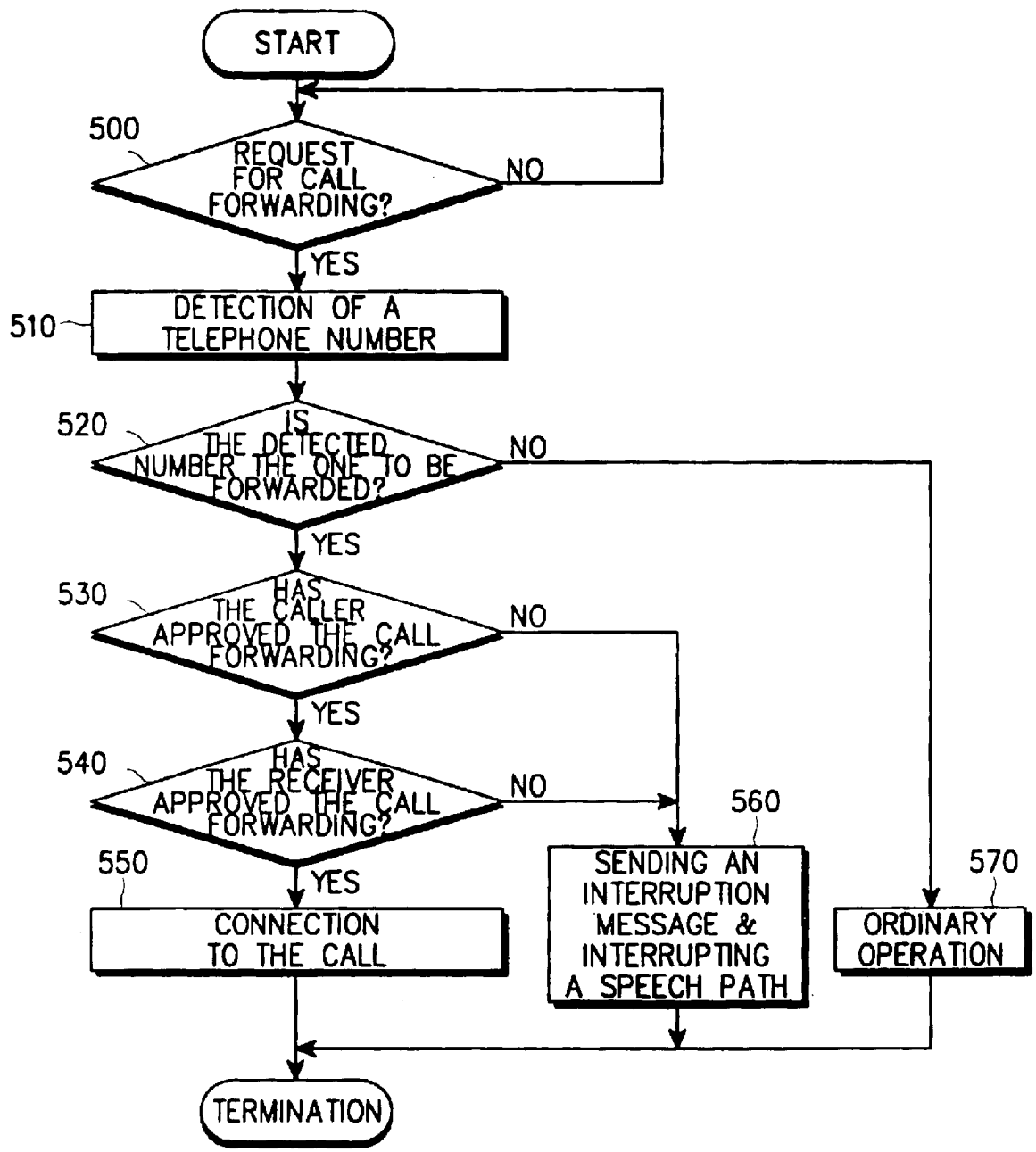

FIG. 5 is a flow chart illustrating the control process for establishing a call connection in a network using a call forwarding feature according to the embodiment of the present invention. Referring to FIG. 5, the subscriber B first sets a request to activate the call forwarding service through the network in order to receive any call that is directed to the subscriber B through the C's telephone number. The subscriber A can designate whether to allow an outgoing call to be connected through the call forwarding service to the subscriber C. At the same time, the subscriber C also designate whether to accept the incoming call that has been call forwarded thereto.

The following is an explanation on the process of connecting an outgoing call from the subscriber A to the subscriber B's telephone number. If the subscriber A requests a call connection to the subscriber B through network in step 500, step 510 is performed to detect the intended telephone number. In step 520, the network checks whether or not the detected telephone number is set to call forwarded to another number. If affirmative, step 530 is performed. If negative, step 570 is performed so that the network can perform an operation to connect or interrupt the call using a normal procedure.

In step 530, the network reads out a pre-set value to determine whether or not the caller has agreed or allowed to benefit the call forwarding service when establishing a call connection to the non-intended telephone number. If affirmative, step 540 is performed. If negative, step 560 is performed to allow the network to transmit a message to the caller notifying that the speech path is interrupted. Similarly, the network may transmit the same message to the receiver end and proceed to interrupt the speech path. Here, the network may immediately interrupt the call after transmitting the call interruption message to the caller, or may solicit an instruction from the caller prior to terminating the call connection. If a message approving the call connection through the call forwarding service is received through the key pad from the caller, the call connection is established. If a message refusing the call connection through the call forwarding service is received from the caller, the call connection is immediately interrupted by transmitting an interruption message to the caller and the receiver.

In step 540, the network checks the data to determine whether or not the receiver terminal has approved to accept the incoming call that was routed from a different number. If affirmative, step 550 is performed, and the network connects the speech path between the subscribers A and C. If negative, step 560 is performed to interrupt the speech path, and the wire or wireless network transmit a message indicating that the call connection is not feasible since the receiver terminal refuses to receive any forwarded calls. Here, the network may immediately interrupt the call by transmitting a call interruption message to the receiver, or request a confirmation from the receiver by sending an option choice to accept the forwarded call in the event that the receiving party changes his or her mind. If a message approving to accept such a call is received from the receiving party through the activation of a key pad by the receiver, the call connection is established. If a message refusing to accept such a call is received, then the call is immediately interrupted and an interruption message is transmitted to both the caller and the receiver.

In sum, as shown in FIG. 5, if a call is directed to a particular telephone number that is activated to forward any incoming calls to another telephone number, the speech path is interrupted or connected depending on whether the calling party or receiving party has preset to transmit or accept such a call connection. Accordingly, the present invention establishes a call connection based on whether a calling subscriber or receiving subscriber has opted to transmit and/or accept any calls that will go under the call forwarding service. Moreover, in the event that a subscriber has pre-programmed to refuse to transmit and/or accept such a call, both the calling party and the receiving party have a chance to override the pre-programmed instruction.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for processing a call connection at a calling end in a telecommunication network having a call forwarding service, said method comprising the steps of:
   pre-programming a calling terminal;
   instructing, at said calling end and according to said pre-programming, as to whether to establish a call connection when an originating call is routed to a new number through said call forwarding service;
   determining whether a message has been received indicating that said originating call from said calling end is routed to said new number; and
   selectively establishing said call connection to said new number if said calling end is instructed to establish said call connection through said call forwarding service.

2. The method of claim 1, wherein said message is a facility message transmitted from said network to said calling end.

3. A method for processing a call connection at a receiving end in a telecommunication network having a call forwarding service, said method comprising the steps of:
   pre-programming a receiving terminal in a manner that selects between modes of performance within said call forwarding service;
   instructing, at said receiving end and according to said pre-programming, as to whether to accept a call connection when an incoming call is transmitted from said call forwarding service;
   upon receiving said incoming call at said receiving end, determining whether said incoming call is a forwarded call via said call forwarding service; and
   selectively accepting said incoming call if said receiving end is instructed to accept said incoming call processed through said call forwarding service.

4. The method of claim 3, wherein said step of determining whether said incoming call is said forwarded call is determined based on a message transmitted from said network.

5. A method for establishing a call connection between a calling terminal and a receiving terminal in a telecommunication network having a call forwarding service, comprising the steps of:
   pre-programming each terminal of said network to accept or refuse said call connection performed through said call forwarding service;
   determining whether to establish said call connection when said calling terminal originates a call to said receiving terminal through said call forwarding service; and
   establishing said call connection between said calling terminal and said receiving terminal if said calling terminal is pre-programmed to establish said call connection through said call forwarding service.

6. The method of claim 5, further comprising the steps of:
   notifying said calling terminal if said call originated from said calling terminal is routed to a new number through said call forwarding service, and
   selectively establishing said call connection by said calling terminal.

7. The method of claim 6, wherein said call connection is selectively established to said calling terminal upon receiving a voice command or the activation of a key pad of said calling terminal.

8. A method for establishing a call connection between an originating terminal and a receiving terminal in a telecommunication network having a call forwarding service, comprising the steps of:
   pre-programming each terminal of said network to accept or refuse a call connection performed through said call forwarding service;
   determining whether to establish said call connection when said receiving terminal receives a call from said originating terminal through said call forwarding service; and
   establishing said call connection between said originating terminal and said receiving terminal if said receiving terminal is pre-programmed to establish said call connection through said call forwarding service.

9. The method of claim 8, further comprising the steps of:
   notifying said receiving terminal if said call from said originating terminal is transmitted from said call forwarding service, and
   selectively establishing said call connection by said receiving terminal.

10. The method of claim 9, wherein said call connection is selectively established to said receiving terminal in response to the activation of a key pad of said calling terminal or upon receiving a voice command.

11. A method for establishing a call connection in a telecommunication network equipped with a call forwarding service, comprising the steps of:

determining whether an originating call from a calling subscriber to an intended subscriber is routed to a terminating subscriber through said call forwarding service;

determining whether said calling subscriber and said terminating subscriber are pre-programmed to establish said call connection when said originating call is routed to said terminating subscriber through said call forwarding service; and selectively establishing said call connection if said calling subscriber and said terminating subscriber are pre-programmed for said call connection when said originating call is routed to said terminating subscriber through said call forwarding service.

12. The method of claim 11, wherein said call connection is not established if said calling subscriber and said terminating subscriber are not pre-programmed for said call connection through said call forwarding service.

13. The method of claim 11, further comprising the steps of:

notifying said calling subscriber and said terminating subscriber when said originating call is routed to said terminating subscriber through said call forwarding service, and selectively establishing said call connection by said calling subscriber and said terminating subscriber.

14. The method of claim 13, wherein said call connection is selectively established to said calling subscriber and said terminating subscriber in response to a voice command or a key pad activation of said calling terminal.

* * * * *